United States Patent [19]

Miyazaki

[11] Patent Number: 5,004,315
[45] Date of Patent: Apr. 2, 1991

[54] OPTICAL CABLE AND OPTICAL CABLE LINE

[75] Inventor: Hiroshi Miyazaki, Ichihara, Japan

[73] Assignee: Furukawa Electric Co., Ltd., Tokyo, Japan

[21] Appl. No.: 542,797

[22] Filed: Jun. 25, 1990

Related U.S. Application Data

[63] Continuation of Ser. No. 663,491, Oct. 22, 1984, abandoned.

[30] Foreign Application Priority Data

Oct. 20, 1983 [JP] Japan ................................. 58-196914

[51] Int. Cl.⁵ .......................... G02B 6/26; G02B 6/42
[52] U.S. Cl. ............................. 350/96.15; 350/96.16
[58] Field of Search ............... 350/96.11, 96.13, 96.15, 350/96.16, 96.21

[56] References Cited

U.S. PATENT DOCUMENTS 4,406,513 9/1983 Raphael ........................... 350/96.16

Primary Examiner—William L. Sikes
Assistant Examiner—Robert E. Wise
Attorney, Agent, or Firm—Fleit, Jacobson, Cohn, Price, Holman & Stern

[57] ABSTRACT

An optical cable in which two branch core wires are formed at the end of the optical fiber core wire. Further, an optical cable line in which a plurality of optical fiber core wires are connected to each other through the ends of the core wires, wherein two branched core wires are formed at the connecting ends of the respective optical fiber core wires, the optical fiber core wires are connected to each other through the branch core wires, and the connector by the branch core wire is formed in a double channel connector. Thus, the optical cable can be readily switched without momentary disconnection.

1 Claim, 1 Drawing Sheet

OPTICAL CABLE AND OPTICAL CABLE LINE

This application is a continuation of application Ser. No. 07/663,491, filed Oct. 22, 1984, now abandoned

BACKGROUND OF THE INVENTION

This invention relates to an optical cable and an optical cable line composed of the cable.

In a commercial communication line, maintenance and replacement works to be carried out in the alteration of a facility, a start of a branch station, an increase in a unit and an alternation of a route upon execution of a municipal maintenance plan are always conducted frequently, and the switching works of cables are also performed at every time of the works. Since it is necessary to instantaneously execute the switching of channels of cables without momentary disconnection, double channels are provided in the line at the switching time to remedy against the execution of the switching works. In case of a metal communication cable, a branch connection can be readily carried out while the channels are alive if the core conductors are exposed by removing the coating of the core wire of the insulated wire, and the double channel can be readily performed in the line.

However, in case of an optical cable, since a continuity cannot be obtained even by contacting the side faces of a bare fibers by removing the coatings of the core wires of the optical fibers, it is not simple like a metal cable to prepare the line in double channels while the channels are alive. This is a large disadvantage of the optical cable line.

SUMMARY OF THE INVENTION

It is an object of this invention to provide an optical cable and an optical cable line composed of the cable which can be readily switched without momentary disconnection.

According to an aspect of this invention, there is provided an optical cable in which two branch core wires are formed at the end of the optical fiber core wire.

According to another aspect of this invention, there is provided an optical cable line in which a plurality of optical fiber core wires are connected to each other through the ends of the core wires, wherein two branched core wires are formed at the connecting ends of the respective optical fiber core wires, the optical fiber core wires are connected to each other through the branch core wires, and the connector by the branch core wire is formed in a double channel connector.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

An optical fiber and an optical fiber line of the present invention will now be described in more detail with reference to the accompanying drawings.

Figure 1A:
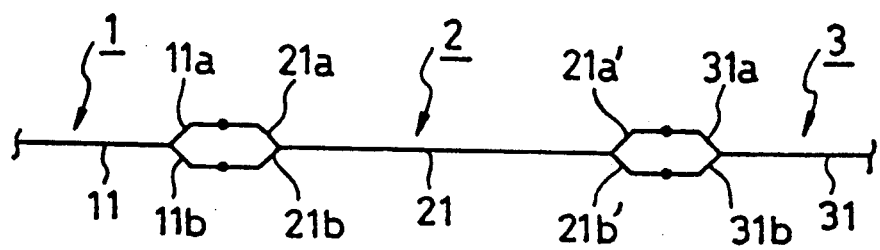
FIGS. 1(a), 1(b) and 1(c) are views showing the construction of an embodiment of an optical cable and an optical cable line constructed according to the present invention.
Figure 1B:
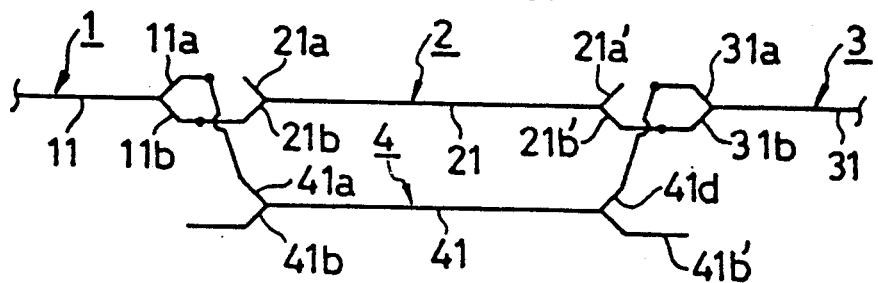
Figure 1C:
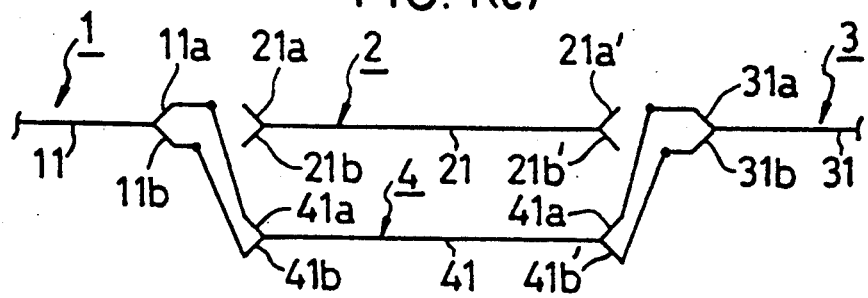

In FIGS. 1(a), 1(b) and 1(c), reference numerals 1, 2 and 3 designate optical cables of this invention. The optical cables 1, 2 and 3 are laid in a predetermined route to construct an optical cable line to be described later. These optical cables 1, 2 and 3 respectively have predetermined numbers of optical fiber core wires 11, 21 and 31. For the convenience of disclosure in the drawings, only one core wire of each cable is shown, but the present invention is not limited to the particular one core wire. The optical fiber core wires 11, 21 and 31 are respectively divided into two branches at the ends. The optical fiber core wires 11 and 31 are omitted at the respective one ends for the convenience of disclosure in the drawings.

Figure 2:
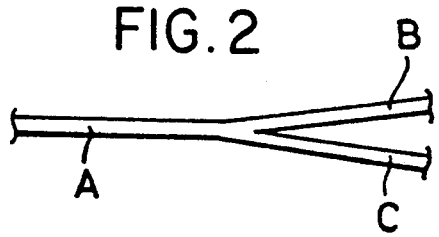
FIG. 2 is a plan view of the branch of the optical fiber core wire used in this embodiment.

Reference numerals 11a, 11b, 21a, 21b, 21a', 21b', 31a, 31b respectively designate branched core wires. (In the specification, the branched core wires will be hereinbelow termed merely to as "a branch core wire".) As the branch of the ends of the respective core wires are employed two core wires B, C fusion-bonded at the ends of a core wire A as shown in FIG. 2. The optical cables 1, 2 and 3 which respectively have the optical fiber core wires 11, 21 and 31 are respectively fusion-bonded and connected, for example, between the 11a and 21a, 11b and 21b, 21a' and 31a, 21b' and 31b as shown in FIG. 1(a) between the branch core wires to form optical cable lines. In other words, the optical cable line of the present invention is formed in double channels by the branch core wires at the connectors of the respective cables.

The case that the optical cable 2 is, for example, switched newly to the optical cable in the optical cable line which is constructed as described above will now be described.

As shown in FIG. 1(b), one of the double channels in the connector of the optical fiber core wires 11, 21, e.g., the channel of the branch core wires 11a, 21a are fist cut. Similarly, in the connector of the optical fiber core wires 21, 31, one of the double channels, e.g., the channel of the core wires 21a', 31a is cut. In this case, the optical cables 1, 2 are connected at between the branch core wires 11b and 21b, and the branch core wires 21b' and 31b are connected in the optical cables 2, 3, and the optical cables 1, 2 and 3 are alive state as the optical cable line. Then, the branch core wire 41a of the one end of the optical fiber core wire 41 of the optical cable 4 to be switched newly is connected to the branch core wire 11a of the optical fiber core wire 11 thus cut. Then, the branch core wire 41a' of the other end of the optical fiber core wire 41 is connected to the branch core wire 31a of the optical cable 3. Thus, after the optical cable 4 to be switches is connected to the optical cables 1, 3, the branch core wires 21b, 21b' of the optical cable 2 are respectively cut from the branch core wire 11b of the optical cable 1 and the branch core wire 31b of the optical cable 3 thus connected. Further, the branch core wire 41b of the optical cable 4 is connected to the branch core wire 11b of the optical cable 1 and the branch core wire 41b' of the optical cable 4 is connected to the branch core wire 31b of the optical cable 3, thereby completing the swithcing of the cables as shown in FIG. 1(c).

Figure 3:
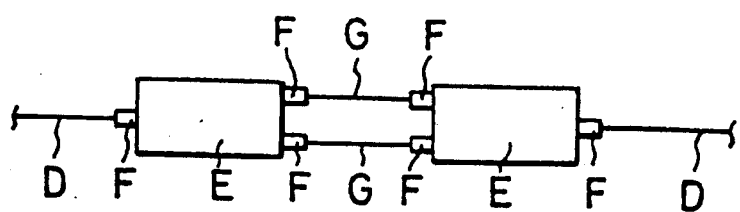
FIG. 3 is a plan view showing another example of the branch of the optical fiber core wire used in this embodiment.

In the embodiment described above, the branch of the end of the optical fiber core wire is composed by fusion-bonding. However, the branch may be, for example, coupled by employing a connector F for an optical branch E at the end of the optical fiber core wire D as shown in FIG. 3. In FIG. 3, reference character G is an optical jumper core wire.

The switching of the optical fiber in the case that the end of the optical fiber core wire is coupled to the optical branch via a connector can be carried out in the same sequence as the case of the first embodiment of this invention merely altering the fusion-bonding to the connector connection, and the detailed description will be omitted.

According to the present invention as described above, the optical cable can readily compose the optical cable line which can be readily switched as desired, and the optical cable line of the invention is formed in the double channel at the connector of the respective optical cables. Therefore, the line can be formed in the double channel by connecting the optical cable to be switched to one of the channels, thereby readily switching the channels without momentary disconnection.

What is claimed is:

1. An optical cable line comprising:

at least three optical cables, each of said cables having two opposite ends and being continuous between said two ends, and each of said two ends being bifurcated to form continuous core wires centrally located between said two ends, a first bifurcation of one end of a first cable of said cables being connected to a first bifurcation of one end of a second cable of said cables and a second bifurcation of said one end of said first cable being connected to a second bifurcation of said one end of said second cable, a first bifurcation of one end of a third cable of said cables being connected to a first bifurcation of the other end of said second cable and a second bifurcation of said one end of said third cable being connected to a second bifurcation of said other end of said second cable, optical information being transmitted simultaneously through both bifurcations of said one end of said first cable to both bifurcations of said one end of said second cable as well as simultaneously through both bifurcations of said other end of said second cable to both bifurcations of said one end of said third cable.

* * * * *